United States Patent [19]
Huber et al.

[11] Patent Number: 5,726,537
[45] Date of Patent: Mar. 10, 1998

[54] CIRCUIT FOR PULSED OPERATION OF A DISCHARGE LAMP

[75] Inventors: Andreas Huber, Maisach; Guenther Hirschmann, Munich, both of Germany

[73] Assignee: Patent-Treuhand-Gesellschaft F. Elektrische Gluehlampen mbH, Munich, Germany

[21] Appl. No.: 622,568

[22] Filed: Mar. 25, 1996

[30] Foreign Application Priority Data

Apr. 27, 1995 [DE] Germany .................. 195 15 510.6

[51] Int. Cl.⁶ .................................................. G05F 1/00
[52] U.S. Cl. ................ 315/311; 315/284; 315/209 R; 315/307; 315/DIG. 7; 315/DIG. 5
[58] Field of Search ................... 315/209 R, 244, 315/246, 247, 194, 284, 319, 223, 224, 291, 307, DIG. 4, DIG. 5, DIG. 7

[56] References Cited

U.S. PATENT DOCUMENTS

| | | | |
|---|---|---|---|
| 4,562,382 | 12/1985 | Elliott | 315/219 |
| 4,792,887 | 12/1988 | Bernitz et al. | 363/89 |
| 4,912,374 | 3/1990 | Nagase et al. | 315/244 |
| 5,128,593 | 7/1992 | Gilbert | 315/287 |
| 5,198,728 | 3/1993 | Bernitz et al. | 315/307 |
| 5,365,151 | 11/1994 | Spiegel et al. | 315/209 R |
| 5,396,152 | 3/1995 | Boenigk | 315/241 R |
| 5,481,162 | 1/1996 | Boenigk et al. | 315/307 |
| 5,483,126 | 1/1996 | Boenigk et al. | 315/307 |

FOREIGN PATENT DOCUMENTS 0 485 865 A1   5/1992   European Pat. Off.

*Primary Examiner*—Robert Pascal
*Assistant Examiner*—Haissa Philogene
*Attorney, Agent, or Firm*—Frishauf, Holtz, Goodman, Langer & Chick, P.C.

[57] ABSTRACT

To provide for automatic switch-over between a power phase and a holding phase in operation of a discharge lamp (EL), a choke or ballast coil (L), serially connected to the discharge lamp, is constructed to have, with respect to current flow therethrough, a non-linear reactance value; the choke or ballast coil is wound on a core which, for example, can be a E-core in which the center leg is of reduced cross-section with respect to the outer legs; or, if one is a torroidal coil on a ring core, the ring core is preferably made of two core elements of different magnetic characteristics, connected together, for example by an adhesive, in which one core element is of low permeability material, such as iron powder or permaloy with high saturation magnetization, and a second core is formed of ferrite with low saturation magnetization. Current flow through the coil and the serially connected lamp is controlled by alternately operating switch elements (S1, S2), typically insulated gate bipolar transistors, to supply power bursts of, for example, between 20 and 30 A during a second operating phase, separated by a first operating phase of between 0.3 A and 0.5 A at a substantially higher frequency than the frequency of the power bursts, and lasting 10 to 30 times as long as the power bursts. An ignition circuit (Z, L-CR) is provided to start or fire the lamp.

21 Claims, 2 Drawing Sheets

CIRCUIT FOR PULSED OPERATION OF A DISCHARGE LAMP

Reference to related patents and applications assigned to the assignee of the present invention, the disclosures of which are hereby incorporated by reference:

U.S. Pat. No. 4,792,887, Bernitz et al.
U.S. Pat. No. 5,198,728, Bernitz et al.
U.S. Pat. No. 5,396,152, Boenigk
U.S. Pat. No. 5,481,162, Boenigk et al.
U.S. Pat. No. 5,483,126, Boenigk et al.
U.S. application Ser. No. 08/539,882, filed Oct. 6, 1995, Bernitz et al.
U.S. application Ser. No. 08/604,420, filed Feb. 21, 1996, Osterried et al.
U.S. application Ser. No. 08/610,634, filed Mar. 4, 1996, Osterried et al.
U.S. application Ser. No. 08/622,519, filed Mar. 25, 1997, Huber et al.

Reference to related publication assigned to the assignee of the present invention:

European 0 485 865 A1, Bernitz et al.

FIELD OF THE INVENTION

The present invention relates to a circuit to operate a discharge lamp, and especially a high-pressure discharge lamp with energy supplied in pulses, and to an electronic accessory or ballast unit which includes the circuit.

BACKGROUND

Discharge lamps and especially high-pressure discharge lamps are customarily operated by currents in which, usually, the amplitude of the lamp current is maintained to be essentially constant over time. The shape of the waveform or of the curve of the current, based on the technical characteristics of the accessory or ballast circuit, may vary, for example, the ballast may provide a sine shaped, triangular shaped, or rectangular shaped lamp current pulse.

It has been found that certain types of discharge lamps may provide light having different parameters when the energy supplied to the lamps is in the form of short sequential pulses or pulse groups. The average energy supplied, in spite of the pulsed supply, need not exceed the lamp power which is determined by the structure of the lamp itself, in order to obtain changes in the light technological parameters. For example, sodium high-pressure discharge lamps can be controlled to operate to provide a light spectrum having a color temperature of about 3,000 K, and more, by changing the electrical operating characteristics of the energy supply.

In pulsed operation, high energy is supplied to the lamp for a short period of time, with a predetermined repetition frequency fw, of for example between about 150–400 Hz. This pulse energy may be above the average lamp power by a factor of more than 20. This high energy phase, which will occur in a second operating state (to be defined and discussed below) can be formed by a single pulse, or by a sequence of pulses or oscillations, in the form of pulse groups, or in the form of a burst. This high-energy supply phase is also often referred to as a power phase since, to generate this pulse burst, the operating mode of the accessory or ballast circuit must be switched over from another operating mode. The duration of this power phase, typically, is only a fraction of a period of the repetition frequency, for example ½0 Tw, in which Tw is the duration of a period of the repetition frequency. A holding phase, which can also be termed a "first operating state" is placed between the power bursts or power phase, in which only so much power is fed to the lamp that the discharge can persist until the next power pulse occurs. Otherwise, a new ignition would be required for each power phase.

The referenced U.S. Pat. No. 5,396,152, Bönigk, the disclosure of which is hereby incorporated by reference, describes a circuit arrangement for pulsed operation of a high-pressure discharge lamp. The discharge lamp is connected to a d-c source through a half-bridge circuit comprising two power switching elements. An inductive reactance formed, for example, by a lamp choke, is connected in series with the lamp. A further inductive reactance can be connected in parallel to the lamp choke to change the energy storage capacity of the circuit. The additionally connectible inductive reactance permits operating the lamp with different electrical parameters in the power phase, or in the holding phase of the lamp, respectively.

The circuit requires an additional power switching element besides the power switching elements included already in the half-bridge, in order to permit selectively connecting the additional inductive reactance. This additional power switch causes a relatively large energy loss due to the voltage drop thereacross and the pulse current passing therethrough. Additionally, such a power switch is expensive; if the power switch is in the form of a semiconductor, it must be designed to have a blocking voltage of over 400 V, while being capable of carrying currents of 30 A, or more. The additional reactive impedance further requires an additional circuit element, which must be wired and connected. The main reactive impedance, as well as the additional reactive impedance within the circuit loop including the lamp, must also be constructed to be capable of accepting high voltages which arise during ignition of the lamp, namely the lamp firing or ignition pulses.

THE INVENTION

It is an object to provide a circuit for pulsed operation of discharge lamps, and an electronic accessory or ballast unit including such a circuit, in which the number of circuit components can be further reduced.

Briefly, the reactive impedance in circuit with the lamp is so constructed that it has a reactance value characteristic which is non-linear, and particularly which is non-linear with respect to current flow therethrough.

The circuit for pulsed operation of the discharge lamp, and particularly of a high-pressure discharge lamp contains, as known, at least a half-bridge with two switching elements, for example transistors. The half-bridge generates an essentially square-wave alternating current at the center of the bridge, that is, at the junction between its two switching elements. A reactive impedance is connected in series with the lamp. The lamp is further coupled to an ignition circuit. In accordance with the present invention, the reactive impedance is a non-linear reactance.

The circuit and the ballast unit, in contrast to the prior art, require only two power switches, typically semiconductor power switches, and only a single reactive impedance element in the lamp circuit. Switch-over between two operating states or phases, for example the first operating or holding phase and the second operating or power phase, is automatically obtained by the reactive impedance which has the non-linear reactance. Preferably, the reactance can be switched essentially between two values. By suitable dimensioning, the best suitable operating currents can be obtained for the respective operating phases of the lamp, that is, the power phase and the holding phase. The relationship of the two reactance values is preferably between 10 and 50; a particularly preferred relationship is about 40.

The reactive impedance in the lamp circuit, typically the lamp choke, is, in accordance with a specifically preferred embodiment, formed as a non-linear inductance.

The non-linearity of the inductance can be obtained, preferably, by providing a ferrite core for the coil which has a center leg which, at least in part, is decreased in size with respect to outer legs. The non-linear reactance may also be formed by providing two torroidal or ring cores of different material characteristics. Preferably, one of the ring cores is made of a low permeability powdered material with high saturation magnetization; the other ring core is made in the form of a high permeability ferrite core with low saturation magnetization. Both ring cores are mounted one above the other.

The accessory unit has the circuit previously described. A control circuit is provided to control the operation of the switching elements in the circuit.

Preferably, the operating current in the first operating state is between about 0.3 and 0.5 A, at a frequency between about 80 kHz and 100 kHz. In a second operating state, the current is preferably between about 20 A and 30 A, and the frequency between 15 kHz and 25 kHz. A particularly suitable and hence preferred frequency is 80 kHz in the first operating state and 20 kHz in the second operating state. In accordance with a preferred example, the temporal relationship of the first operating state to the second operating state is between about 10 and 30; the duration of the second operating state, that is, the power phase, may, for example, be about 200 microseconds, at a repetition frequency of, for example, 200 Hz.

In accordance with a particularly preferred embodiment of the electronic accessory or ballast unit, the power circuit arrangement and the control circuit are coupled inductively. Preferably, a control transformer is provided having a primary winding and two secondary windings. The switching elements are, preferably, power semiconductors, especially insulated gate bipolar transistors (IGBT). Such power transistors can be easily controlled and have low switching losses, while carrying high currents.

Ignition of the lamp, preferably, is obtained by an ignition system which can be formed by at least one additional winding on the non-linear reactive impedance. Thus, the non-linear reactive impedance, preferably a non-linear inductance, obtains a further function, namely to generate and transmit the ignition pulse.

The discharge lamp can also be fired or ignited by means of a capacitative element connected in parallel to the discharge lamp. This capacitative element, typically a capacitor, together with the non-linear reactance, forms a series oscillatory or tuned circuit. If the ignition pulse is generated by the additional capacitor-reactance circuit, the additional winding on the non-linear inductance, as well as the switching components to generate a voltage pulse on the additional winding can be omitted.

Various types of d-c current supply circuits use an intermediate circuit capacitor at the output of the d-c source, typically a rectifier. In accordance with a feature of the invention, the intermediate capacitor is replaced by two serially connected capacitors, and the junction of the serially connected capacitors is connected to the discharge lamp. The coupling capacitor thus can be eliminated, thereby reducing the volume of the overall accessory circuit substantially. The arrangement has the additional advantage that the serially connected capacitors can be provided in the form of electrolytic capacitors which, in the pulse operation and in contrast to a coupling capacitor which customarily was a foil wound capacitor, will be noiseless.

DRAWINGS

FIG. 3b is a top view of the core FIG. 3a;

DETAILED DESCRIPTION

Figure 1:
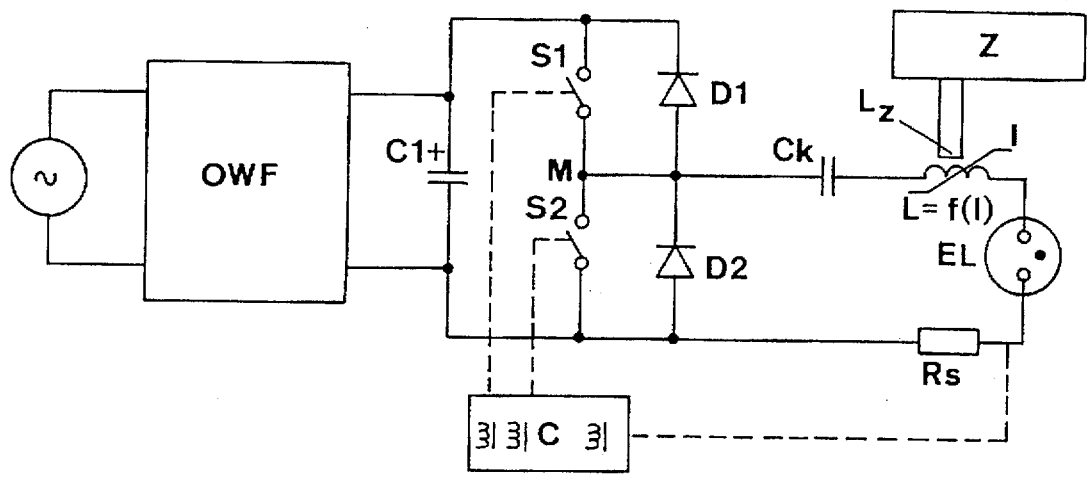
FIG. 1 is a highly schematic block diagram of a circuit in accordance with the present invention, and having an additional ignition circuit.

FIG. 1 illustrates the basic circuit which includes a circuit arrangement OWF comprising a rectifier adapted for connection to an a-c power network, and including an active harmonic filter for power factor correction. The power source may, for example, be a 220 V power network. The output of circuit OWF provides an essentially constant d-c voltage of about 400 V.

An intermediate capacitor C1 is connected to the output terminals of the harmonic filter OWF for buffering the output energy while the a-c power wave goes through zero or null. The circuit according to the present invention is connected to the output terminals of the filter as well, to operate the discharge lamp EL. Preferably, and typically, the discharge lamp EL is a high-pressure discharge lamp.

The essential elements of the circuit in accordance with the present invention are two power switches S1, S2, arranged in half-bridge configuration and having a common junction M, generating a square-wave alternating voltage. The switches S1, S2 are controlled in push-pull from a control unit C. Typically, the switches S1, S2 are semiconductor switches.

An inductive reactance formed by a lamp choke L is connected in series with the lamp. A coupling capacitor Ck forms an additional energy storage element in the loop circuit which includes the lamp. Two diodes D1, D2 are connected in parallel to the switches S1, S2 to provide free-wheeling or by-pass to the switch units. The diodes D1, D2 are polarized in blocking direction with respect to the direct voltage of the harmonic filter OWF.

The lamp is started or fired by an ignition circuit Z, and applying ignition pulses by an additional winding on the inductive reactance L. The ignition circuit Z provides a voltage pulse which is coupled by the additional winding $L_z$, shown only schematically. The ratio of turns of the auxiliary winding and of the winding of the inductive reactance is so selected that a high voltage pulse is generated at the side of the reactance adjacent the lamp, in order to fire the discharge lamp.

A current measuring resistor Rs is connected in series with the discharge lamp L. The resistor Rs may be a portion of the control circuit C or, respectively, can be connected directly therewith. The control circuit C controls the operation of the switches S1 and S2. At the common junction M, a square-wave voltage of predetermined frequency is generated. The switches S1 and S2, in the first operating state, are operated at a relatively high frequency $F_H$, and in a second operating state with a relatively low frequency $F_T$.

Details of the basic circuit described above are described in the referenced U.S. Pat. No. 5,396,152, Bönigk, the disclosure of which is hereby incorporated by reference.

In accordance with a feature of the present invention, the reactive impedance formed by the choke L has a reactance which is non-linear, and which depends on the current flowing therethrough. The operating current of the lamp, derived from the switches S1 and S2, is determined by the reactive impedance of the non-linear reactance L and, of course, the square-wave voltage applied thereto. In the first operating state, in which the switches operate at the relatively high frequency $f_H$, the current $I_H$ to operate the discharge lamp EL will have values in which the non-linear reactance L at the most has a first value of L'; during the second operating state, with a relatively lower frequency $f_T$, the current $I_T$ to operate the discharge lamp EL will have values in which the non-linear reactance L has a reactive impedance which is between a first value L' and a second value L".

The current measuring resistor Rs is used to control current amplitude by varying the switching condition, and hence the impedance value of the non-linear reactance L which, for example, can be controlled by the influence of temperature of a core material within the core of the reactive impedance L. The operation of the non-linear inductive reactance will be described below with reference to FIG. 5.

Figure 2:
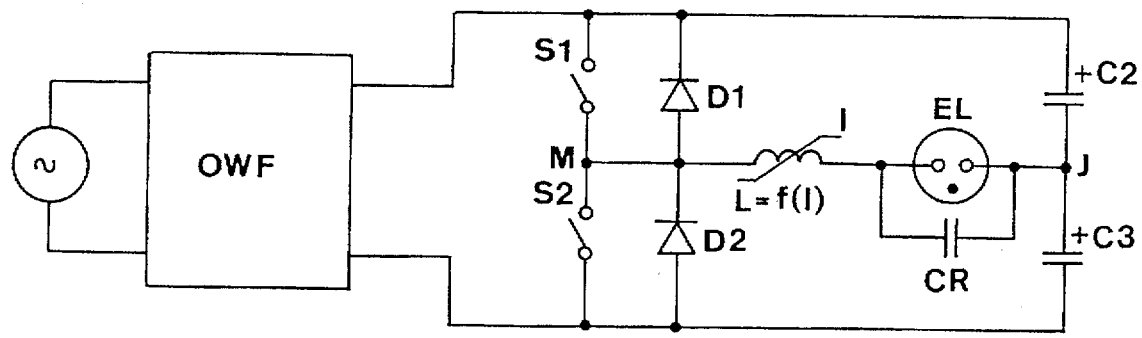
FIG. 2 illustrates another embodiment of the present invention with a resonance ignition circuit.

FIG. 2 illustrates another embodiment of the invention. The difference with respect to the embodiment described in FIG. 1 is the arrangement for firing the lamp, and the filtering of the output from the rectifier-harmonic filter OWF.

The ignition circuit Z (FIG. 1) need not be used. Rather, a resonance capacitor CR is connected in parallel to the lamp EL, to provide, in combination with the non-linear reactance L, a resonance firing for the lamp. The intermediate capacitor C1 which, in FIG. 1 is connected to the output terminals of the filter OWF, is, rather, separated into two capacitors C2, C3, which define a common junction J. Together, they have the same effect as the capacitor C1 of FIG. 1. Preferably, the value of capacity of the capacitors C2, C3, serially connected, is the same as the capacity value of the capacitor C1. This arrangement permits elimination of the coupling capacitor Ck, and the lamp EL is then connected to the common junction J between the capacitors C2, C3 and through the non-linear inductance L to the common junction M between the switches S1, S2.

The circuit according to FIG. 2 replaces the pulse ignition from the circuit Z (FIG. 1) by resonant voltage enhancement of the resonance circuit by the capacitor CR and the inductance L. The advantage of the pulse ignition according to FIG. 1 is a low power use to build up the high voltage, and excellent reproducibility of the ignition voltage over the lifetime of the accessory circuit. The advantage of the circuit of the second embodiment is that it permits the use of two separate intermediate circuit capacitors which can be formed as electrolytic capacitors, eliminating the coupling capacitor Ck. The coupling capacitor Ck, typically, is a wound foil capacitor which, in the course of time, may become noisy. The control circuit C preferably includes inductive coupling to the switches S1, S2, as schematically shown in FIG. 1. The control circuit C, and the current measuring resistor Rs has been omitted from FIG. 2 for clarity of the Figure; it can be connected similarly as shown in FIG. 1.

Figure 5:
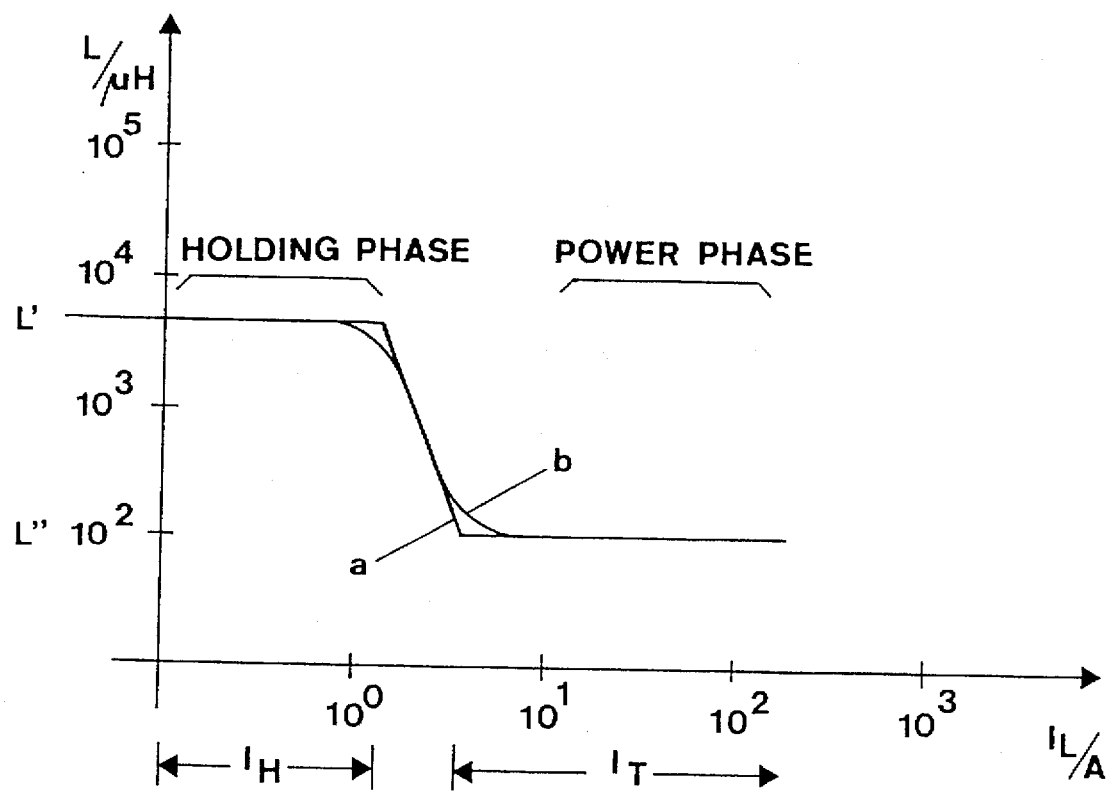
FIG. 5 is a graph which illustrates the dependence of inductance of the non-linear reactance (ordinate) as a function of lamp operating current (abscissa).

Operation, with reference to FIG. 5:

FIG. 5 illustrates the course of inductance of the non-linear impedance L with respect to lamp operating current $I_L$. The basis for dimensioning and the construction of the non-linear reactance is formed by the first and second operating states and the respective frequencies $f_H$ and $f_T$ not shown in FIG. 5. The operating currents, as well as their time duration and the relative time durations, provide the desired light parameters of the lamp.

In a first operating state, namely a holding state or holding phase, the operating current $I_L$ has a small value, indicated at $I_H$, so that the inductance will have a relatively high impedance and a high inductance value L'. In this state, the inductance is not saturated. In the second operating state, that is, during the power phase, the operating current $I_L$ is high, as shown by the current value $I_T$ so that the impedance, and hence the inductance L", is relatively low. Under this condition, the inductance is saturated. Switch-over between the two operating phases is obtained by change in frequency in control of the two power switches S1, S2 (FIGS. 1 and 2). FIG. 5 shows ideal switching conditions in the respective operating phases in solid line a and the actual course b of the function L, which is a function of current or, mathematically, $$L=f(I).$$

The reactance value L, hence can be switched between the two values L' and L". The ratio L'/L" should be between about 10 and 50, and preferably is about 40.

The switch-over point or, respectively, the transition region will depend on the temperature of the core material (FIGS. 3 and 4) of the non-linear reactance L.

The switch-over region between L', that is, with an unsaturated inductance, and L", with a saturated inductance, is so selected that at the maximum arising operating current in the first operating phase, namely the holding phase, and the maximum arising core temperature, the core will not reach the saturation value. In accordance with a feature of the present invention, disturbing temperature influences can be compensated for by suitable control of the lamp currents by measuring the lamp currents by the measuring resistor Rs, and providing a control value to the control circuit C. Thus, disturbing temperature influences on the reactance L, which is a cored reactance, can be eliminated.

The second operating state, when $I_T$ flows through the saturated reactance L", is shorter than the first operating state, when current $I_H$ flows through the unsaturated reactance L'. The temporal duration between the first operating state or phase and the second operating state or phase is between about 10 and 30.

Figure 3A:
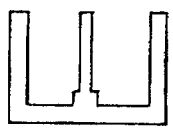
FIG. 3a illustrates a ferrite core having a center leg of reduced size to form a non-linear inductance.
Figure 3B:

The inductance values, as a function of current, can be obtained by using a customary, commercial construction of a ferrite core, having the usual commercial designations E, RM, P, ETD, and the like. The center leg of the core, as best seen in FIGS. 3a and 3b, is made smaller than the outer legs thereof. This shape can be obtained by taking a standard core and grinding it to the desired shape; alternatively, specially pressed or compacted cores with the special shape predetermined can be used. The center leg can be decreased in cross-section over its entire length or only over a portion thereof. FIG. 3a and FIG. 3b show one example of a core which has a center leg partially constricted with respect to the outer legs.

Figure 4:
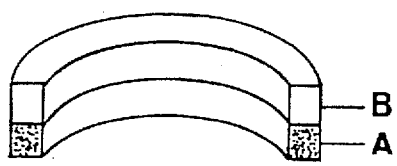
FIG. 4 is a pictorial view, sectionalized, through a ring core made of two different materials to form a non-linear inductance.

Another way to obtain a reactance in which the inductive reactivity changes with current is to combine two ring cores of different material characteristics. A low permeability powdered core A formed, for example, of iron powder, permaloy powder or the like, with high saturation magnetization, is secured on a high permeability ferrite core B of low saturation magnetization. The two cores can be connected together, for example, by an adhesive. Both cores are then wound conjointly. FIG. 4 illustrates a half-section through such a core.

The circuit in accordance with the present invention is preferably operated by providing for the first operating phase, that is, the holding phase, a holding current of 0.3 A to 0.5 A, and at a frequency of between about 80 kHz to 100 kHz. A pulse current of from 20 A to 30 A at a frequency of 15 kHz to 25 kHz is provided during the power phase, that is, the second operating state or phase. The second state, during which the power burst is supplied, is short and has a duration of typically about 200 µs. This means that a burst or package of pulses during the power phase will have about six individual oscillations or periods. The repetition frequency of these bursts or, respectively, of the power phase, may vary between about 160 Hz and 400 Hz.

The switches S1 and S2 preferably are power transistors and are controlled in push-pull, inversely with respect to each other, with a duty cycle of about 50%. Preferably, insulated gate bipolar transistors (IGBT) are used. The IGBTs are inductively controlled by a control transformer, integrated in the control circuit C, and shown only schematically in FIG. 1. Such a control transformer may have a primary winding of about 50 turns and two separate secondary windings of, each, 120 turns.

In accordance with a feature of the invention, the power portion of the electronic accessory circuit for pulsed operation of a discharge lamp requires only two power switches S1, S2. Switch-over between the operating phases of the lamp, namely the holding phase and the power phase, is obtained by the non-linear reactance in series with the lamp and in the lamp circuit. The reactive impedance of this reactance element L is dependent on current flowing therethrough. The operation of the lamp in the holding phase or in the power phase, respectively, requires currents of highly different current values which cause reactances L with relatively different reactance values in the holding phase and in the power phase, respectively.

Various changes and modifications may be made, and any features described herein with respect to one embodiment may be used with any of the other embodiments, within the scope of the inventive concept.

We claim:
1. A circuit for pulsed operation of a discharge lamp (EL) having
a source (OWF) of direct current;
a d-c - a-c converter bridge circuit having two switching elements (S1, S2) coupled to receive the d-c energy from said source (OWF) and having its output coupled to the lamp (EL);
a reactive impedance (L; Ck; C2, C3) serially connected to the discharge lamp (EL) and the output of the bridge converter circuit;
and a firing or ignition circuit (Z; CR) coupled to the lamp and providing firing or ignition pulses thereto,
wherein, in accordance with the invention,
the reactive impedance (L; Ck; C2, C3) comprises a reactive impedance element which has a reactance value characteristic which is non-linear with respect to current flow therethrough.

2. The circuit of claim 1, wherein the reactance value ($L_H$, $L_T$) of said non-linear reactive impedance (L; Ck; C2, C3) is switchable essentially between a first value (L') and a second value (L").

3. The circuit of claim 2, wherein the ratio of reactance values (L'/L") is between about 10 and 50.

4. The circuit of claim 3, wherein said ratio of reactance values (L'/L") is about 40.

5. The circuit of claim 1, wherein said reactive impedance element comprises an inductance (L) having a core, and
wherein said core has two outer legs and a center leg, in which the center leg is, at least in part, of smaller cross-section than the outer legs.

6. The circuit of claim 1, wherein said reactive impedance includes an inductance (L) having a core, and
wherein said core has two ring core elements of different magnetic material characteristics.

7. The circuit of claim 6, wherein one of the ring cores comprises a low permeability powder core (A) having a high saturation magnetization, and a second ring core (B) of a high permeability ferrite having low saturation magnetization; and wherein said two ring cores are mounted essentially concentrically one above the other.

8. The circuit of claim 2, further including means (C) for controlling current flow through said non-linear reactive impedance (L; Ck; C2, C3) to control the impedance value thereof as a function of current flow.

9. An electronic accessory or ballast circuit for a discharge lamp (EL) comprising the circuit of claim 1;
said source of direct (OWF) current energy; and
a control circuit (C) for controlling operation of said two switching elements (S1, S2) in a manner in which,
in a first operating state or phase, the switching elements (S1, S2) are controlled to operate at the relatively high frequency $f_H$, so that the current ($I_H$) to operate a discharge lamp (EL) has values in which the non-linear reactive impedance (L; Ck; C2, C3) will have impedance values maximally of a first value (L'), and
in a second operating state, the switching elements (S1, S2) are controlled to operate at a relatively low frequency ($F_T$), where the current ($I_T$) to operate the discharge lamp (EL) will have values in which the reactance of the non-linear reactive impedance (L; Ck; C2, C3) will have a value between said first value (L') and a lower second value (L").

10. The circuit or ballast of claim 9, wherein the current ($I_H$) in the first phase is between about 0.3 A and 0.5 A, and the frequency ($f_H$) is between about 80 kHz and 100 kHz.

11. The circuit or ballast of claim 9, wherein the current ($I_T$) in the second phase is between about 20 A and 30 A, and the frequency ($f_T$) is between about 15 kHz and 25 kHz.

12. The circuit or ballast of claim 10, wherein the current ($I_T$) in the second phase is between about 20 A and 30 A, and the frequency ($f_T$) is between about 15 kHz and 25 kHz.

13. The circuit or ballast of claim 9, wherein the time duration of the second operating phase or state is shorter than the first operating phase or state.

14. The circuit or ballast of claim 13, wherein the temporal relationship between the first operating state or phase and the second operating state or phase is between about 10 and 30.

15. The circuit or ballast of claim 9, wherein said control circuit (C) and said circuits for pulsed operation of the discharge lamp are inductively coupled.

16. The circuit or ballast of claim 9, wherein said switching elements (S1, S2) comprise power transistors, optionally insulated gate bipolar transistors (IGBT).

17. The circuit or ballast of claim 9, wherein said non-linear reactive impedance comprises an inductive non-linear reactance element, and wherein said ignition circuit (Z) comprises an inductive coupling (Lz) to said non-linear inductive reactance element (L).

18. The circuit or ballast of claim 9, wherein said non-linear reactive impedance includes a non-linear inductive reactance element, and wherein said firing or ignition circuit (CR) includes a capacitor which, together with said non-linear inductive reactance element (L), forms a resonance circuit.

19. The circuit or ballast of claim 9, further including current measuring means (Rs) to measure the operating current flowing to the discharge lamp (EL), and coupled to said control circuit (C).

20. The circuit or ballast of claim 9, wherein said control circuit (C) controls said switching elements (S1, S2) in the second operating state or phase to maintain the amplitude of the operating current supply to said lamp (EL) essentially constant.

21. The circuit or ballast of claim 9, wherein said direct current energy source (OWF) is connected to two serially connected smoothing capacitors (C2, C3), defining a common junction (J); and wherein said discharge lamp (EL) is connected to said common junction (J).

* * * * *